US006247634B1

(12) United States Patent
Whitehouse

(10) Patent No.: US 6,247,634 B1
(45) Date of Patent: Jun. 19, 2001

(54) METHOD AND APPARATUS FOR FORMING A STIR WELDED JOINT AT MEETING CYLINDRICAL EDGES

(75) Inventor: James A. Whitehouse, Gig Harbor, WA (US)

(73) Assignee: MCE Technologies Incorporated, Seattle, WA (US)

( * ) Notice: Subject to any disclaimer, the term of this patent is extended or adjusted under 35 U.S.C. 154(b) by 0 days.

(21) Appl. No.: 09/345,587

(22) Filed: Jun. 30, 1999

(51) Int. Cl.[7] ............................. B23K 20/12; B23K 31/02
(52) U.S. Cl. ...................... 228/112.1; 228/113; 228/114; 228/114.5; 228/184
(58) Field of Search ............................. 228/112.1, 234.1, 228/113, 114, 114.5, 2.1, 184, 44.5, 49.3; 156/73.1; 428/940

(56) References Cited

U.S. PATENT DOCUMENTS

| 3,949,896 | * | 4/1976 | Luc ........................................ 220/75 |
| 3,972,464 | * | 8/1976 | Codo et al. ........................... 228/112 |
| 4,342,799 | * | 8/1982 | Schwochert ............................ 428/35 |
| 4,462,849 | * | 7/1984 | MacLaughlin et al. ............. 156/73.5 |
| 4,628,150 | * | 12/1986 | Luc ........................................ 174/88 |
| 4,835,829 | * | 6/1989 | Welschof et al. ................... 29/159.3 |
| 4,858,815 | * | 8/1989 | Roberts et al. .......................... 228/2 |
| 4,959,241 | * | 9/1990 | Thomas et al. .......................... 427/11 |
| 5,031,288 | * | 7/1991 | Sadler ................................. 29/889.21 |
| 5,069,382 | * | 12/1991 | Misiak et al. ......................... 228/146 |
| 5,071,018 | * | 12/1991 | Moore ................................... 220/86.2 |
| 5,519,182 | * | 5/1996 | Linzell ................................ 219/117.1 |
| 5,535,938 | * | 7/1996 | Leduc .................................... 228/212 |
| 5,564,731 | * | 10/1996 | Gallagher et al. ................. 280/728.3 |
| 5,568,893 | * | 10/1996 | Depperman ......................... 228/44.5 |
| 5,620,652 | * | 4/1997 | Tack et al. ............................ 420/532 |
| 6,068,178 | * | 5/2000 | Michisaka .......................... 228/112.1 |
| 6,070,784 | * | 6/2000 | Holt et al. .......................... 228/112.1 |
| 6,109,503 | * | 8/2000 | Parker .................................. 228/44.5 |
| 6,119,916 | * | 9/2000 | Anderson et al. .................... 228/44.5 |

FOREIGN PATENT DOCUMENTS

2058692  *  4/1981  (GB).
1147859A  *  7/1997  (JP).

* cited by examiner

Primary Examiner—Patrick Ryan
Assistant Examiner—Zidia Pittman
(74) Attorney, Agent, or Firm—Seed IP Law Group PLLC

(57) ABSTRACT

A knock-down anvil assembly provides a rotary anvil ring inside the cylindrical end portions of tank sections to be stir welded together as a butt joint, and an external reactive roller unit is provided which bears against the outer faces of these end portions at a location diametrically opposite from the stir welding tool. The anvil assembly can be disassembled within the finished tank into components which can be individually removed through an access opening in an end cover of the tank.

9 Claims, 10 Drawing Sheets

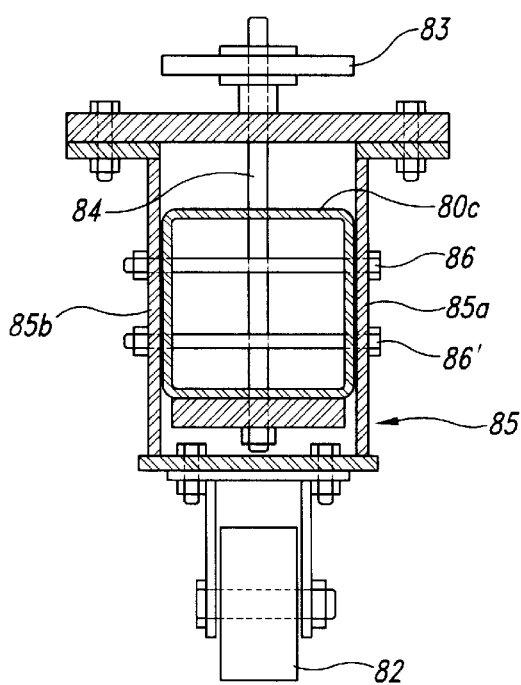
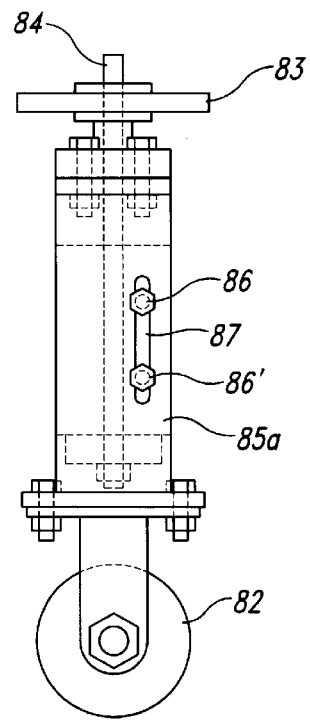
Fig. 2C    Fig. 2D
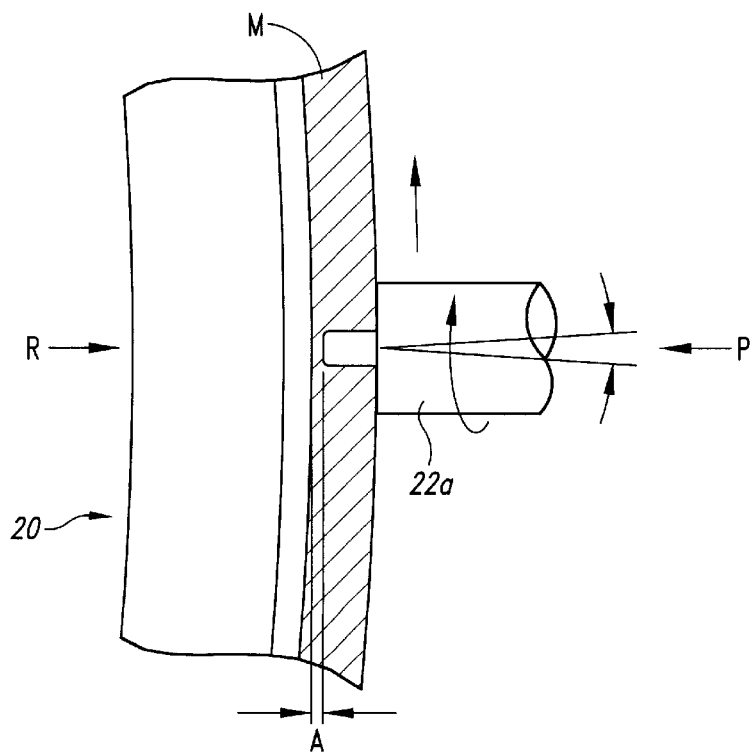
Fig. 3

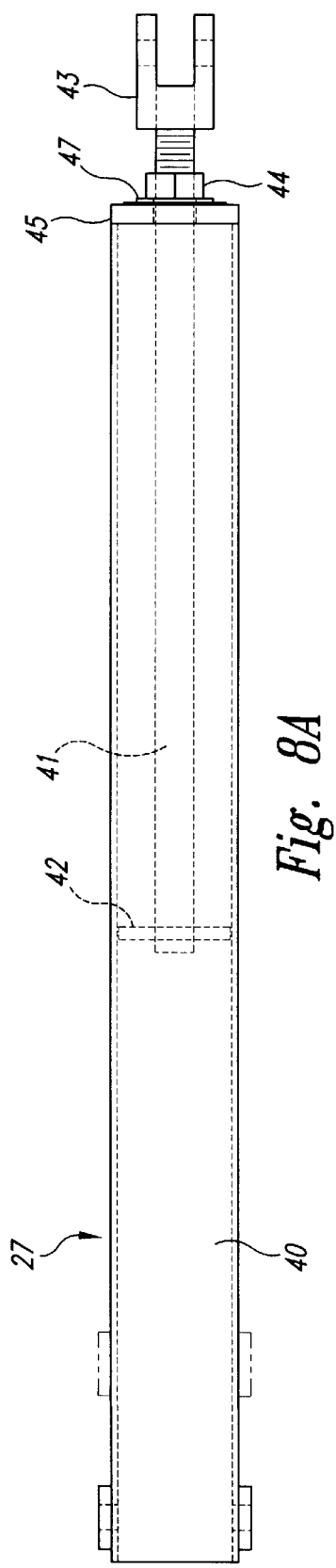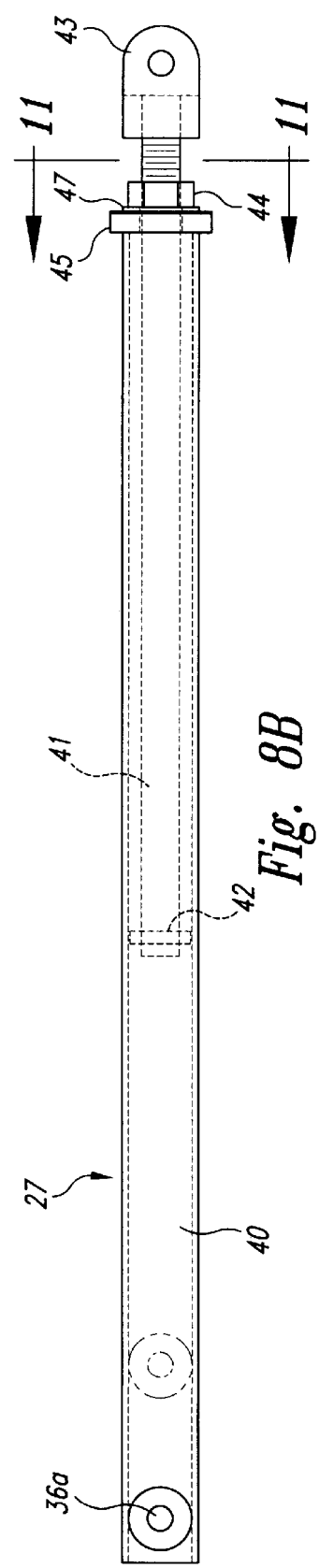

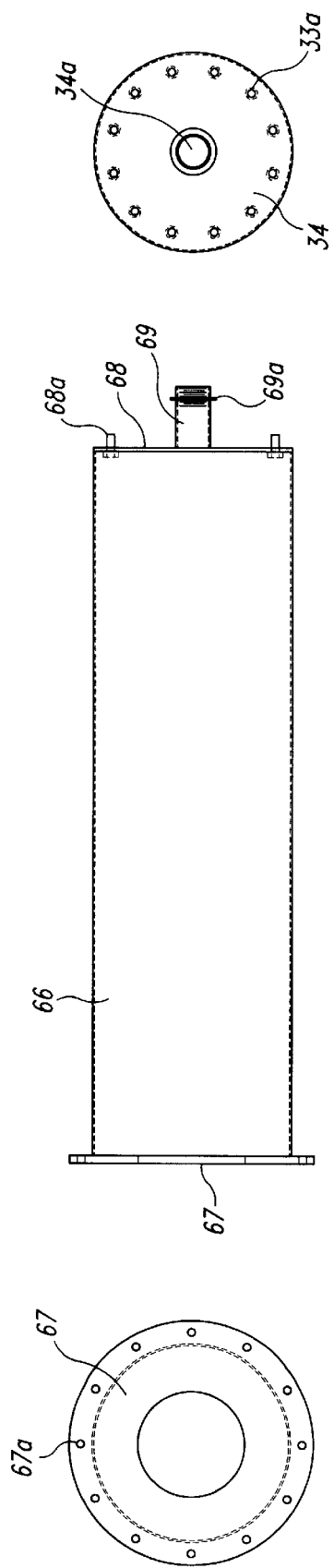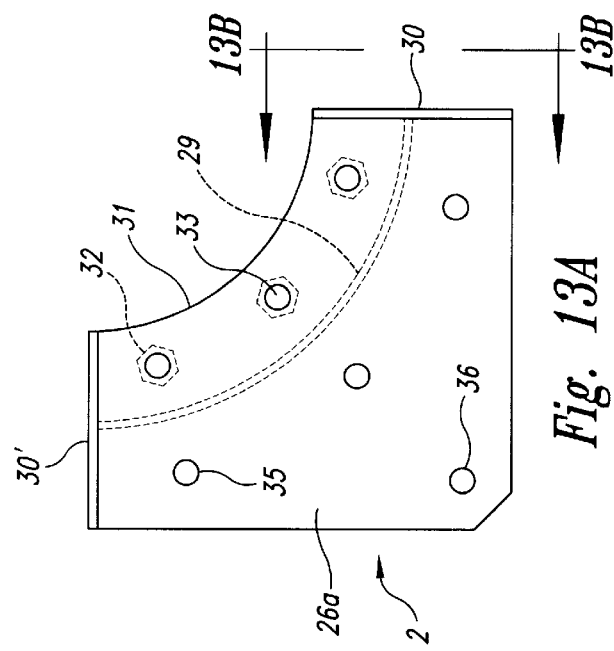

METHOD AND APPARATUS FOR FORMING A STIR WELDED JOINT AT MEETING CYLINDRICAL EDGES

TECHNICAL FIELD

The present invention relates to the welding of joints on large tanks, and particularly to stir welding circumferential joints between cylindrical bodies and dome shaped end covers.

BACKGROUND OF THE INVENTION

Friction stir welding (hereinafter referred to as "stir welding") is a relatively new joining technology disclosed in U.S. Pat. No. 5,460,317, whereby alloys such as 7075 aluminum and various forms of aluminum/lithium previously considered to be unweldable alloys, can be welded to provide joints having minimal change to the structural properties of the parent materials and extremely low dimensional distortion. Unlike fusion welding where portions of each piece being welded are melted and then resolidified to form a new and different material structure, stir welding is a solid state process. Joining is accomplished by stirring and intermixing plasticized material from each part across the joint boundary. Heating and mixing is accomplished simultaneously in stir welding by employing a stepped cylindrical tool having a head pin or probe surrounded at its root end by an annular shoulder. The tool is rotated at a precise computer controlled speed and pressed against the work piece at the joint with substantial axial force which may be in the range of 12,000 to 20,000 pounds. Friction between the rotating probe and work pieces causes local heating and ultimately plasticizing of the material in close proximity to the probe. Once sufficient heat has been generated the material yields and the probe plunges through most of the thickness of the material until the annual shoulder of the tool contacts the surface of the work pieces. The material adjoining the joint is then blended by moving the spinning tool along the joint centerline at a carefully controlled rate and attack angle between the plane of the annular shoulder and that surface of the work pieces. As the probe and shoulder move relative to the work pieces they simultaneously heat and remove material from the leading surfaces in front of the tool and deposit this material onto the trailing surface. The relative movement of the tool along the joint may be accomplished by moving the tool or by moving the work pieces.

Fuel tanks for space vehicles commonly have thin cylindrical body shells with dome-shaped end covers secured together by welding. The thin walls of the tanks may be reinforced by integral internal grids. These grids are machined in flat tank sections which are then bent to provide laterally curved sections. They are then placed side-by-side and connected together by longitudinal butt welds to form cylindrical tank sections. Such sections are in turn welded together at circumferential joints at their ends, and finally, end domes are welded in place at circumferential end joints to complete a tank. Each end cover normally has an access opening which usually is centered, but may not be, and is of a size, about thirty inches in diameter, adequate to permit personnel to enter the tanks during construction and for inspection. Currently, to achieve minimum weight while maintaining adequate strength, materials such as aluminum/lithium alloys are preferred for fabricating the fuel tanks, but this choice requires that stir welding be used. Since the fuel tanks are large, in the range of about 15 to 27 feet in diameter, and commonly 50 feet or so in length, and have relatively thin walls, in the range of about ³⁄₁₆ to ⅝ inches, for example, stir welding of circumferential joints is difficult. The final joint securing the second end cover in place, has been a particularly vexing problem since the tank is then completely closed except for the access openings in the end covers, and hence, passage for removal of fixtures is very limited. The problem is compounded by the fact that considerable pressure is exerted by the stir welding probe on the work, and hence the work must be backed by a suitable anvil opposite the probe. This means that an anvil must be inside the tank. It also means that the probe pressure must be resisted by a reactive force acting on the outside of the tank. However, such a reactive force together with the probe pressure may seriously distort and perhaps even partly crush the tank unless they are somehow adequately resisted by structure other than the tank.

SUMMARY OF THE INVENTION

The present invention seeks to solve the foregoing problems by providing a rotary ring inside the cylindrical end portions of the tank sections to be stir welded together as a butt joint, and by providing an external reactive roller unit bearing against the outer faces of these end portions at a location diametrically opposite from the stir welding tool. Further, the anvil ring is constructed so that it can be disassembled within the finished tank and removed in pieces through one of the end access openings.

A huge lathe-like machine is used to handle and turn the tank sections and the anvil ring relative to the stir welding tool. This machine has a headstock in the form of a long projecting beam truss with a large motor driven head at its outer end, and has a tailstock with a complementing motor driven head. The turning of these heads is synchronously controlled so that the heads turn in perfect unison. The cylindrical tank sections are supported on sets of rollers mounted on rails extending longitudinally between the headstock and tailstock and the end covers are supported by extenders from the headstock and tailstock. The hub of the anvil ring is mounted on a tubular spindle projecting from the headstock.

BRIEF DESCRIPTION OF THE DRAWINGS

FIG. 2C is a side view of the rear adjustable wheel assembly in operative position mounted on the rear lower cross-member of the reactive roller unit, the cross-member being shown in transverse section.

FIG. 2D is a rear view of the adjustable wheel assembly shown in FIG. 2C.

FIG. 3 illustrates a stir welding operation in accordance with the present invention.

FIGS. 8A and 8B are top and side views of a spoke unit of the anvil assembly when viewed as in FIG. 5.

FIG. 12A is an end view of a head plate for a tubular spindle.

FIG. 12B is a side elevational view of the tubular spindle.

FIG. 12C is a plan view of the hub plate for the anvil assembly.

FIG. 13A is a plan view of one of the hub assembly segments of the anvil assembly as viewed in FIG. 5.

FIG. 13B is an end view of the hub assembly segment taken as indicated by line 13B—13B in FIG. 13A.

DETAILED DESCRIPTION OF THE INVENTION

Figure 1:
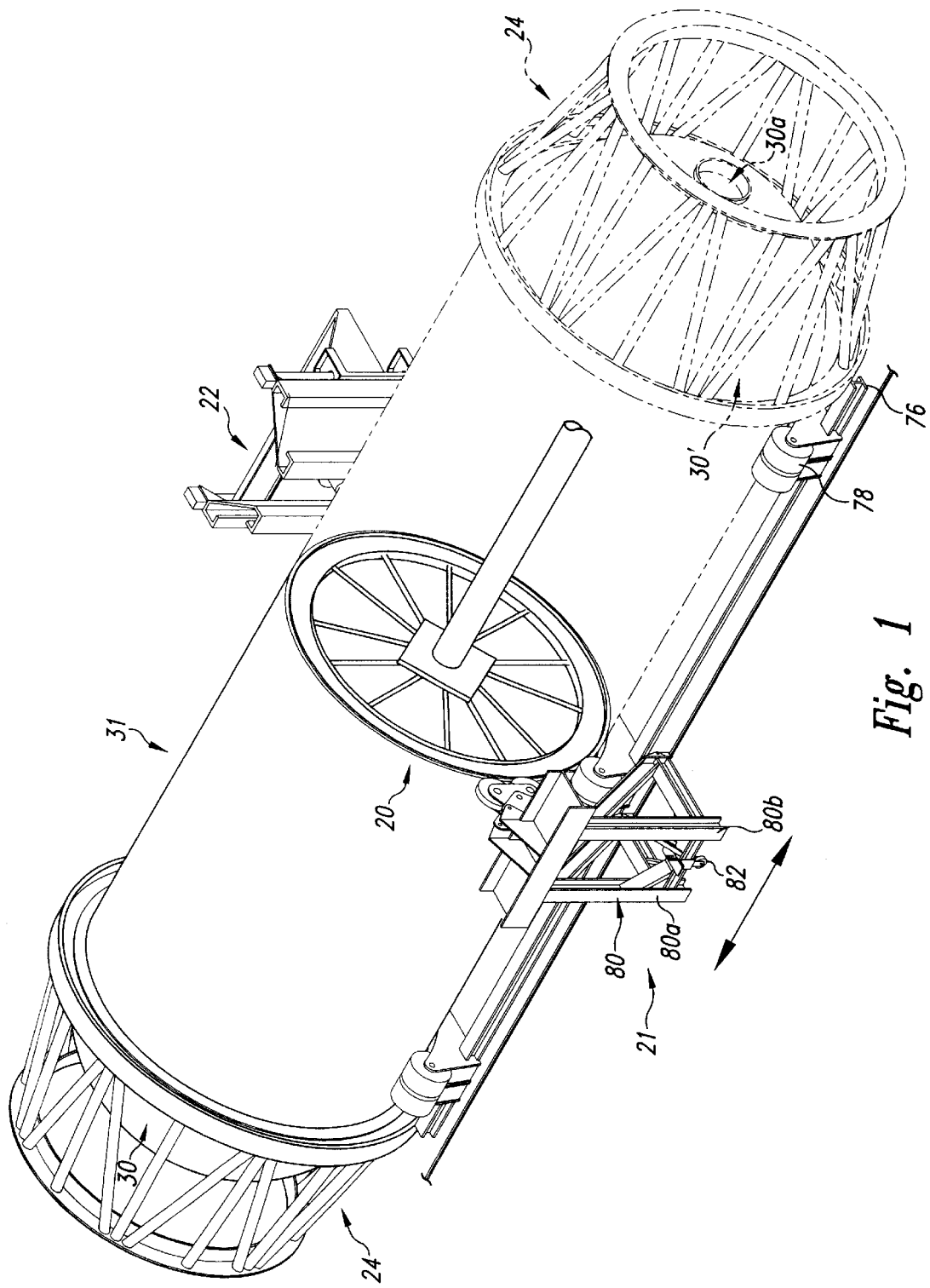
FIG. 1 is a perspective view, partly in phantom, illustrating a tank having a central circumferential weld being performed in accordance with the present invention.
Figure 2A:
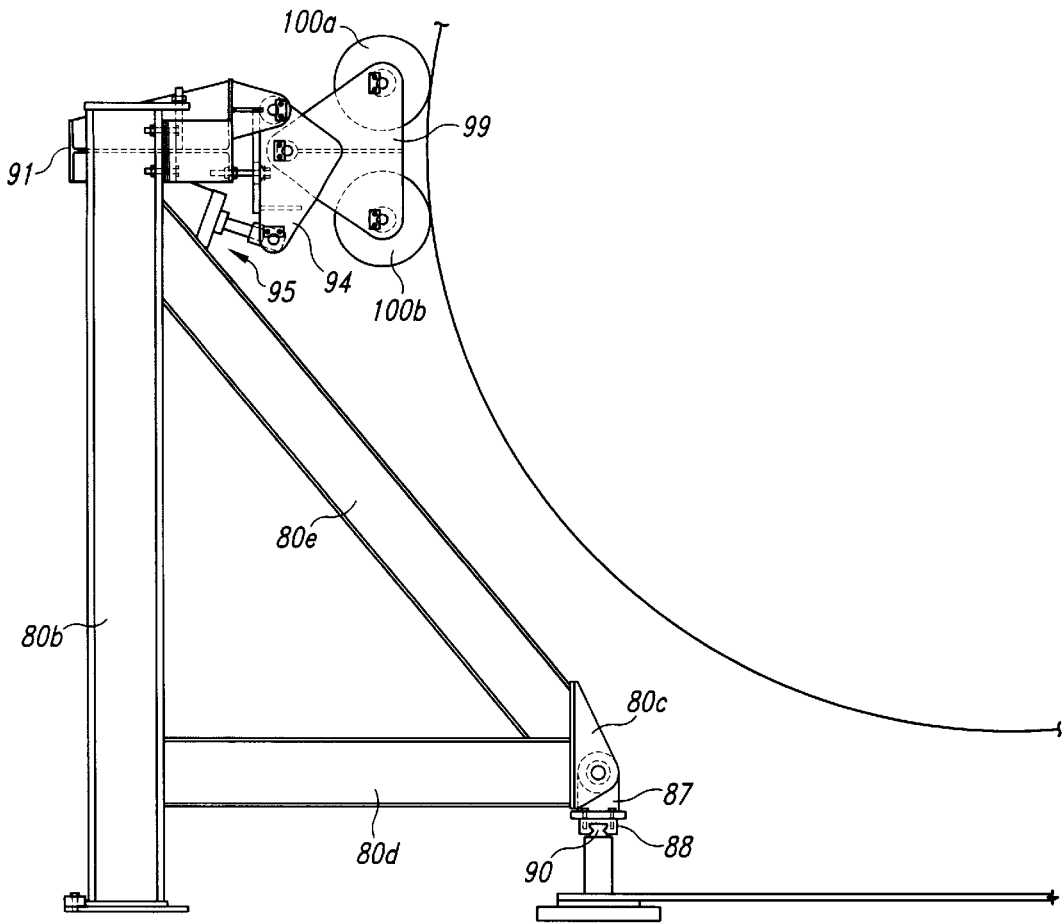
FIG. 2A is a side elevational view, partly in phantom, of the reactive roller unit shown in operating position.
Figure 2B:
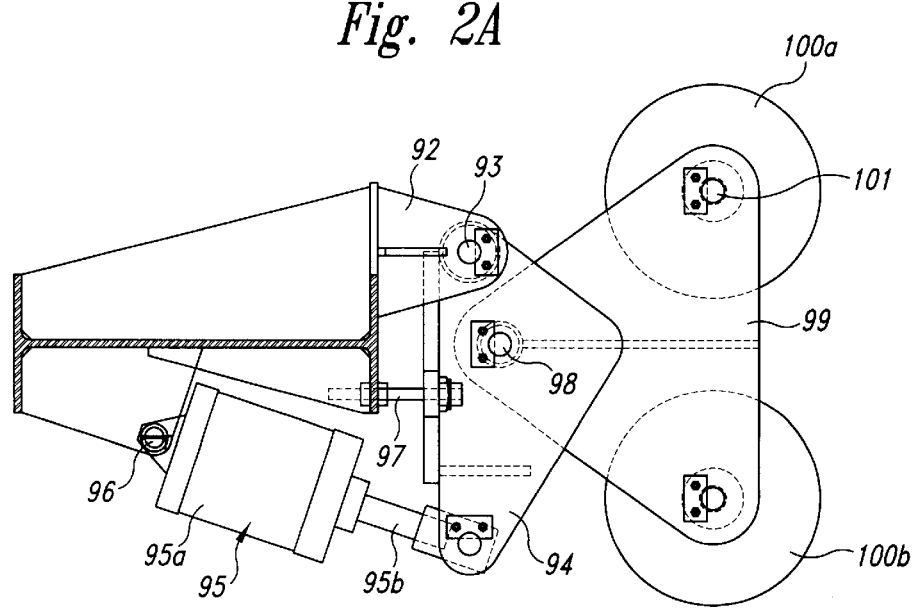
FIG. 2B shows the head portion of the reactive roller unit as illustrated in FIG. 2A drawn to a larger scale.
Figure 4A:
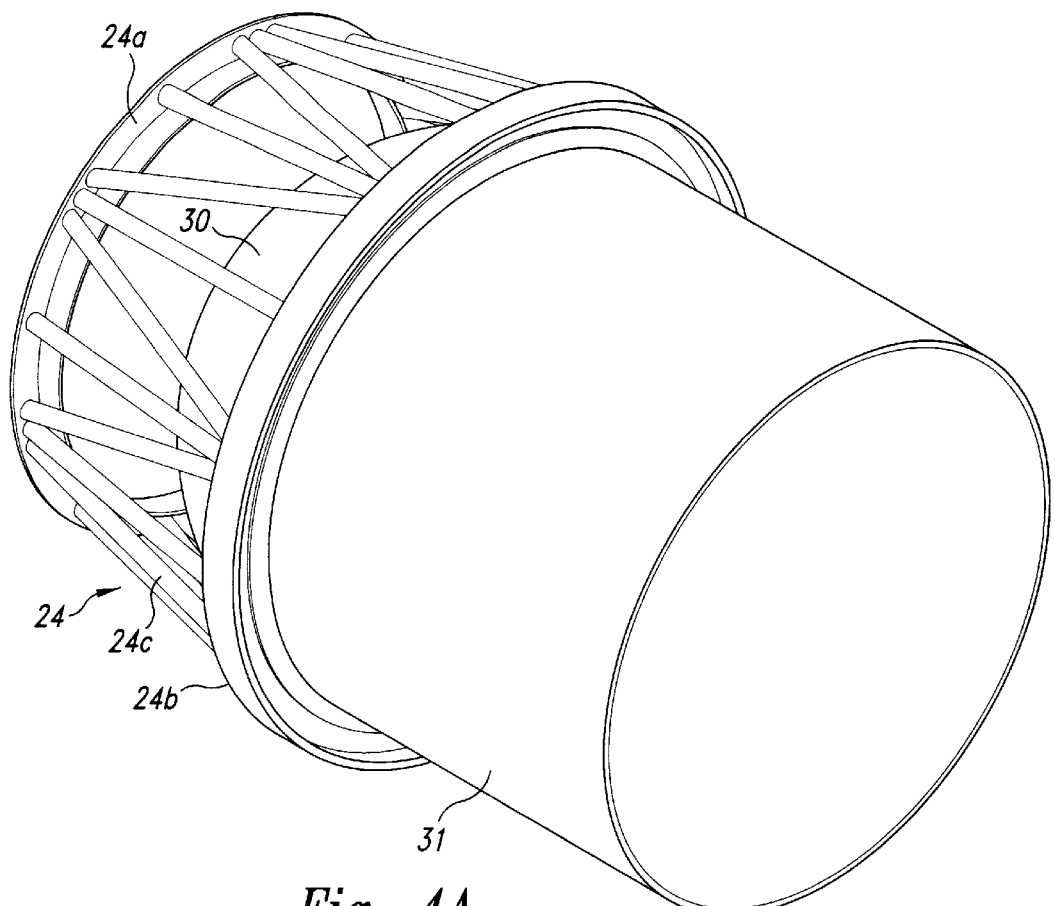
FIG. 4A is a perspective view showing the supporting of the dome at one end of a tank by a frusto-conical extender.
Figure 4B:
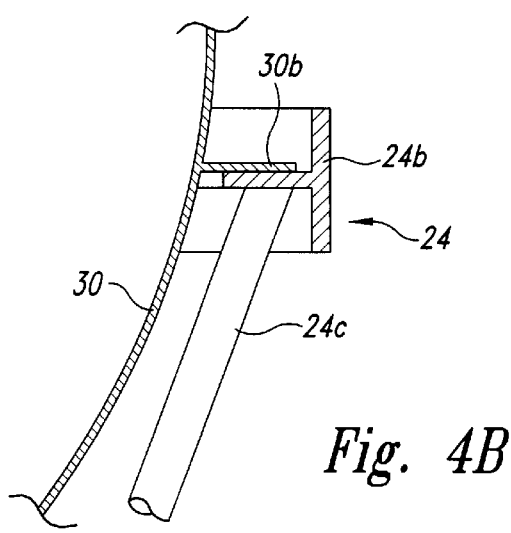
FIG. 4B is a detail view showing the fit of the flange on the dome with the extender.
Figure 5:
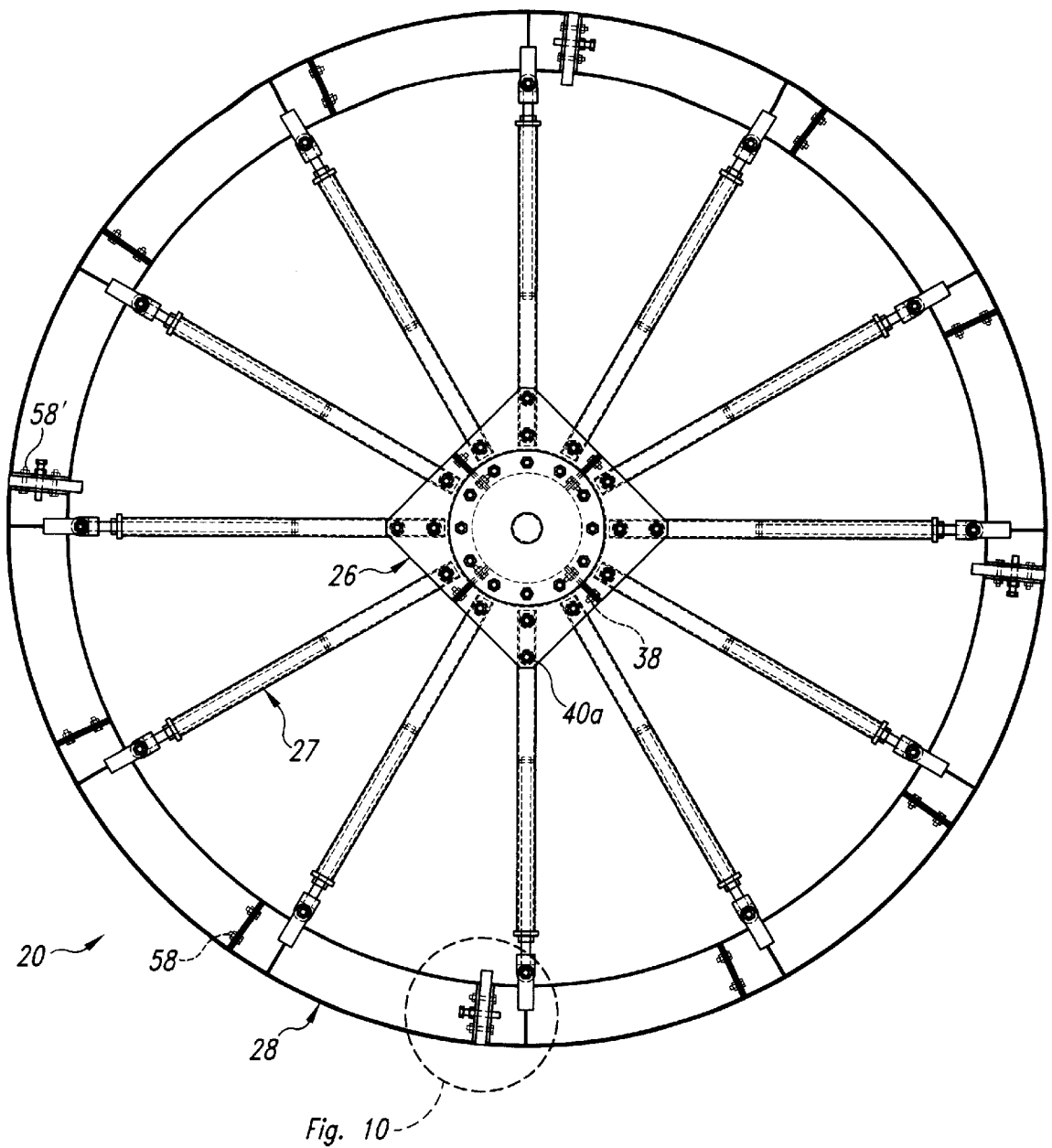
FIG. 5 is an end view of an anvil assembly made in accordance with the present invention.
Figure 6:
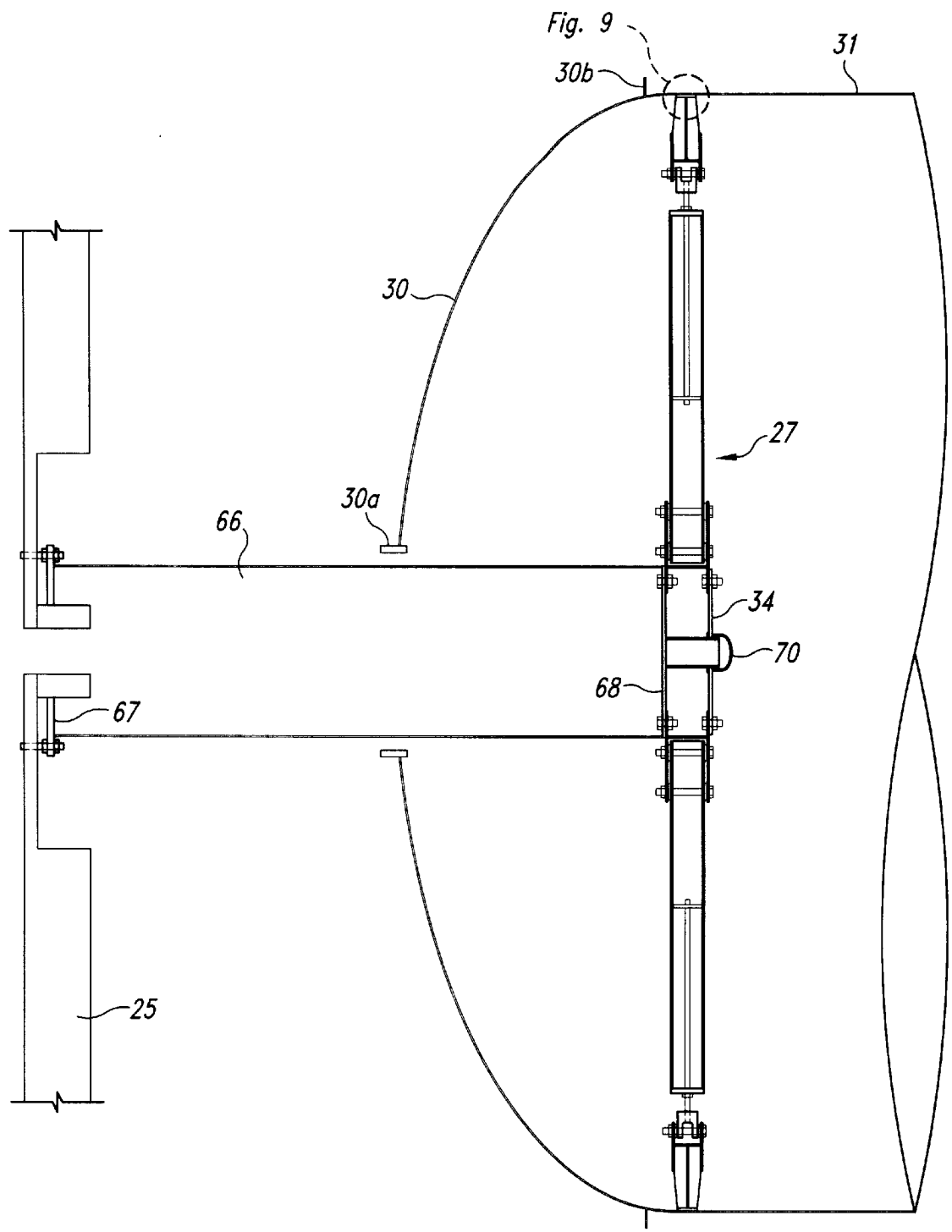
FIG. 6 is a side elevational view of the anvil assembly mounted in operating position when a dome is being welded onto a cylindrical tank section.

As previously indicated, the present invention provides a special anvil assembly 20 and reactive roller unit 21 used in conjunction with a stir welding machine 22 and lathe-like machine having a synchronized headstock and tailstock on which frusto-conical extenders 24 are mounted. The anvil assembly 20 comprises a hub assembly 26, adjustable spoke units 27 and a rim assembly 28, all of which can be disassembled into components which can be handled manually and removed by passing through an access opening 30a in one of the cover domes 30 of a tank 31. The hub assembly 26 has four like segments 26a (FIGS. 13A–13B) each having a pair of front and back face plates 28–28' separated by an arcuate web 29 and by a pair of radial end plates 30–31'. Cut from one corner portion of the face plates is a quadrant leaving a curved edge 31 extending between inner ends of the radial end plates 30–31'. The parts of each hub assembly segment are welded together and nuts 32 are welded to the inner face of the front face plate in alignment with of set a three holes 33 therethrough arranged in an arcuate layout. These holes register with holes 33a in a center round hub plate 34 (FIG. 12C). A second set of three holes 35 in the face plates 28 is radially aligned with the first set and a seventh hole 36 is radially aligned with the center holes of the two sets of three holes each. This hole pattern is provided in both face plates. In addition the two radial end plates 30–31' each have a set of four holes 37 arranged in a rectangle so that two holes are inboard and two holes are outboard with respect to the respective end of the arcuate web 29. The four hub segments 26a are bolted together by bolts 38 passing through registering sets of the holes 37 with the end plate 30 of each registering with the end plate 30' of another.

Figure 11:
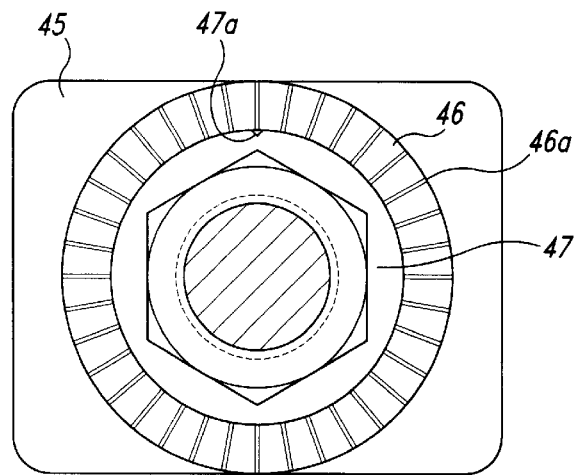
FIG. 11 is a detail view showing a spoke adjustment indicator and is taken as indicated by line 11—11 in FIG. 8B.

Continuing to the spoke units 27, each has a tubular spoke 40 of rectangular cross-section, and has a length adjustment mechanism comprising a threaded rod 41, a rectangular rotation stop element 42 fixed on the rod inside the spoke 40, a clevis 43 fixed on the outer end of the rod, and an adjustment nut 44 threaded on the rod. A rectangular end plate 45 is mounted on the outer end of the tubular spoke 40 and has a center hole for free passage of the rod 41. As shown in FIG. 11, the end plate 45 also has a decal 46 presenting radiating markings 46a every 10 degrees, for example, to register with a pointer in the form of a v-notch 47a in the perimeter of a washer 47 attached to the adjustment nut 44. Clockwise turning of the nut 44 while bearing against the end plate 45 causes the rod 41 and clevis 43 to move outwardly relative to the spoke 40 to make the effective length of the spoke units 27 adjustable. At their inner ends, the spokes 40 have reinforced transverse holes 35a to register with one of the holes 35 in the hub segments 26a, and four of the spokes 40 also have a second reinforced transverse hole 36a to register with one of the holes 36 in the hub segments 26a. Bolts 40a pass through the registering holes to secure the spokes to the hub assembly.

The rim assembly 28 is formed by multiple arcuate segments 48 and shims 49. In cross-section each arcuate rim segment 48 is an I-beam having inner and outer flanges 50–51 separated by a central web 52. The outer flanges 51 are narrower than the inner flanges and function as an anvil. For purposes of example the rim assembly is shown as having twelve segments 48 and four shims 49 arranged in a symmetrical arrangement. Each segment 48 has a fork unit 53 extending radially therefrom toward a common center and having fork arms welded to the outer edges of the inner flanges 50 of the segment and to the outer edges of transverse supplemental web 54 on the segment located on opposite sides of the central web 52. Bolts 55 connect the fork units 53 to the spoke clevises 43.

Figure 7A:
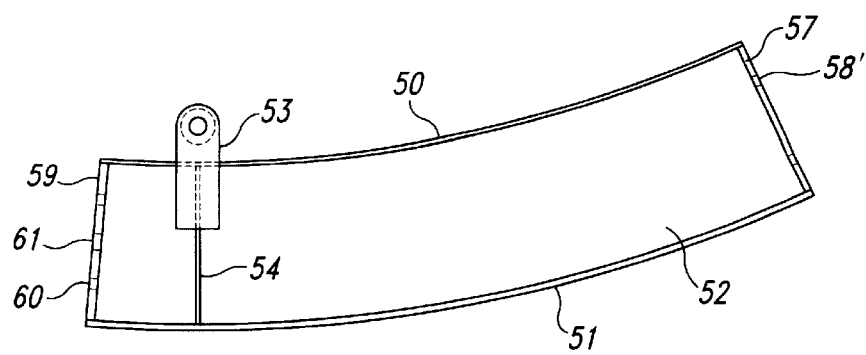
FIGS. 7A, 7B and 7C are side views of the various rim sections of the anvil as viewed in FIG. 5.
Figure 7B:
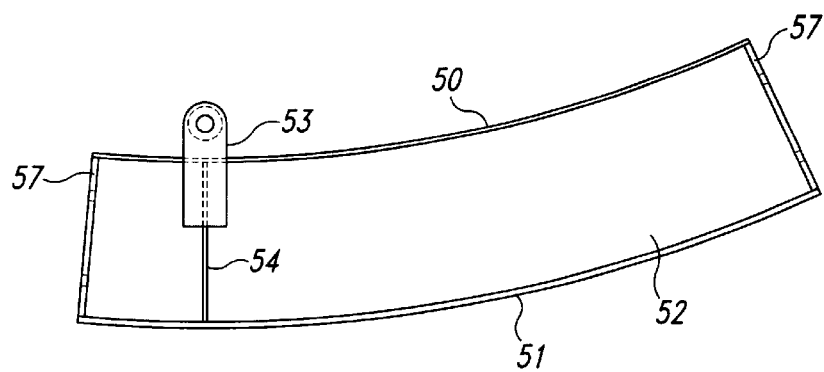
Figure 7C:
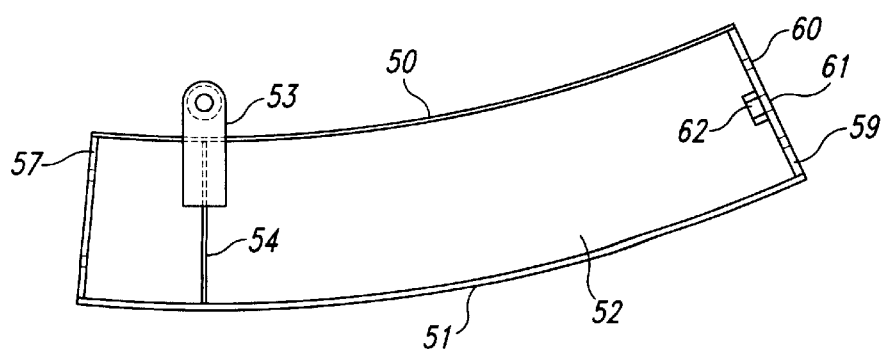
Figure 9:
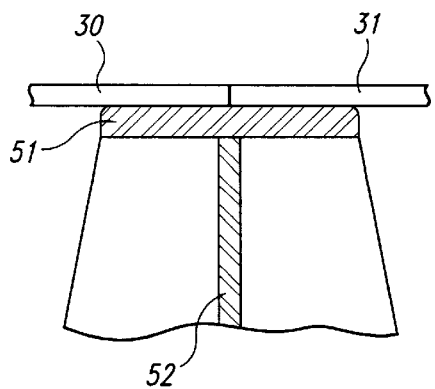
FIG. 9 is a detail view of the anvil at a joint being stir welded, as indicated by the FIG. 9 notation in FIG. 6.
Figure 10:
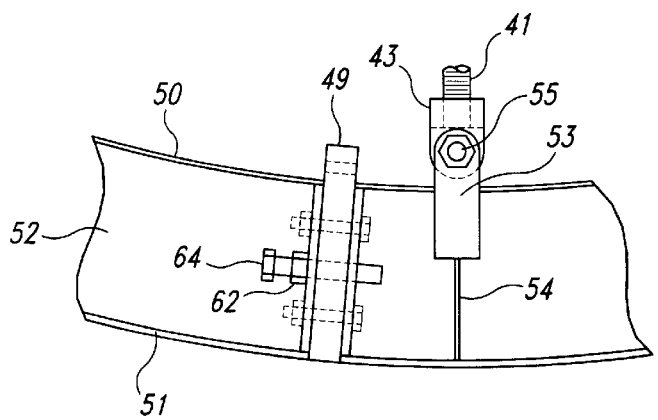
FIG. 10 is an enlarged detail view showing the connection of two rim sections and a shim as indicated by the FIG. 10 notation in FIG. 5.

Four of the rim segments designated 48a (FIG. 7B), have like end plates 57 mounted on both ends and these end plates are opposed by like end plates on one of the ends of the remaining eight rim segments. Four bolts 58 passing through registering holes 58' secure each pair of opposing end plates together. The other ends of the remaining eight segments are provided with wider end plates 59 functioning as clamping jaws for gripping the shims 49 at expansion joints. These clamping jaws each have a rectangular pattern of four bolt holes 60 and also have two intermediate guide holes 61 which are preferably spaced apart slightly further than the width of the rectangular pattern of holes 60. This hole pattern width is such that clamping bolts 58' passing through the holes will closely straddle a shim 49 when it is positioned between two of the clamping jaws. As shown in FIGS. 7C and 10, alternate of the end plates 59 have their intermediate holes backed with nuts 62 to threadably receive dowel functioning bolts 64 for use in initially positioning the rim segments before insertion of the shims. Then the bolts 58 are inserted in the holes 60 and tightened with the outer end of the shims flush with the outer surface of the outer flanges 51.

A relatively large tube 66 functions as a spindle projecting axially from the tailstock and, as shown in FIG. 12A, has an annular head plate 67 providing a border flange with a set of holes 67a for receiving bolts to mount the spindle on the tailstock. The projecting outer end of the spindle is closed by an end plate 68 having a ring of studs 68a projecting outwardly therefrom to fit into the holes 33a in the hub plates 34. A length of pipe 69 projects from the center of the end plate 67b and has a welded collar 69a. The pipe 69 is threaded outwardly of the collar. When the spindle 66 is joined to the anvil ring assembly the pipe collar backs against the center hub plate 34 and the outer threaded portion of the pipe 69 projects through a center opening 34a in the hub plate and receives an anchoring cap 70.

The anvil ring assembly 20 is initially assembled without the shims 49 in place at the four expansion joints. Then after a cylindrical tank section (shell) 31a of the tank and another tank section or a dome-shaped end cover 30 are positioned in butting relation preparatory to being welded together, the adjustment nuts 55 are tightened sequentially one turn each at a time until the anvil ring expands sufficiently to make contact with the shell head. Then expansion of the spokes is continued by turning the adjustment nuts 55 about 60° at a time in sequence. The gaps at the expansion joints are measured and the shims are machined to fit the gaps. The adjustment bolts are turned an additional 120° and the shims are installed. Then the adjustment bolts are backed off 120° and the bolts 58–58' at the expansion joints are fully tightened. The outer ends of the shims are prefinished with a curvature to match the curvature of the outer anvil faces of the rim segments. Thus when the expansion joints are tight the rim assembly presents a smooth circular anvil face.

Each dome-shaped end cover 30 is provided with an external wrap around flange 30b adjacent its mouth for ease of handling. As previously indicated, the headstock and tailstock may each be provided with a frusto-conical extender 24. Each extender has a trusswork 24c extending between front and back mounting rings 24a–24b, with the back ring 24b being the larger of the two and may have a T-shape. The front ring 24a is bolted to the headstock or tailstock, and the back ring 24b is bolted to the wrap around flange 30b on the related end dome 30 to thereby hold and position the dome such that it is centered on the rotational axis of the lathe. The spindle 66 of the tailstock extends through the center access opening 30a of the respective cover dome when the cover is to be welded in position. A pair of floor-mounted linear bearing rails 76 are mounted in parallel relation to the rotational axis at equal distances therefrom greater than the radius of the tank being fabricated. Sets of roller units 78 are mounted by linear bearings on the rails 76 at intervals there along such that the rollers on the units hold the tank sections and back ring 24b of the extenders 24 centered at the rotational axis.

The external reactive roller unit 21 has a rigid frame 80 having a pair of rear corner posts 80a–80b interconnected by a rear tubular cross member 80c from which a wheel 82 is suspended. This wheel is adjustable in elevation by the turning of a wing nut 83 on a vertical rod 84 to optionally lower the wheel 82 into ground engagement and thereby raise the rear of the frame 80 such as to lift the rear corner posts 80a–80b out of the ground engagement. The rod 84 is vertically screwed through the upper wall of the cross member and carries a box frame 85 straddling the cross member 80c and carrying the wheel 82. The box frame 85 is vertically guided by a pair of bolts 86–86' passing horizontally through the cross member and vertical slots 87 in opposite sides 85–85' of the box frame.

A pair of arms 80d extend forwardly from the corner posts 80a–80b and are braced by a pair of sloped braces which together with the outer ends of the arms 80d are connected to brackets 80e from which a pair of feet 87 are swing mounted. These feet carry linear bearings 88 mounted on a longitudinal rail 90 extended along the floor.

At their upper end the corner posts are connected by a second cross member 91 on the center of which is mounted a support unit 92 for a cross pin 93 carrying a vertical swing frame 94. This swing frame is urged to swing forwardly away from the upper cross member by a sloping pneumatic cylinder unit 95 having its cylinder 95a pivotally mounted at the rear on pin 96 and its piston rod 95b pivotally connected to the swing frame 94 so that extension of the piston rod swings the swing frame forwardly. This forward swing is limited by a stop bolt 97 anchored to the support unit and passing through a slot in a central part of the swing frame 94 to a stop head bridging the front end of the slot. The swing frame in turn has a cross-pin 98 on which are swing-mounted a pair of triangular cheek plates 99 carrying a pair of rollers 100a–100b on axles 101 adjacent to the apexes. These rollers are arranged to track on the seam being stir welded at a location whereat the midpoint between the rollers is substantially diametrically opposite from the probe 22a of the stir welding machine 22. This machine is mounted so that the angle of attack of the probe can be adjusted as the seam to be welded moves circumferentially. In other words the tilt axis of the probe and related mechanism is kept parallel to the center axis of the tank sections.

As illustrated in FIG. 3, the stir welding machine rotates the probe 22a while pressing the probe axially into the material M of the butting parts at the joint. In accordance with the present invention, the axial pressure P of the probe against the material M is resisted by the cooperative resistance R of the anvil assembly 20 and the reactive roller unit 21. The angle of attack A of the probe is also indicated in FIG. 3.

After the described equipment is used to stir weld the second end cover 31' of a tank in place, the anvil assembly is manually disassembled by a worker or workers entering the tank through the access opening 30a in the second end cover after the tailstock has been disconnected and backed away. The construction of the anvil assembly is such that it can be disassembled to parts which all can be lifted and passed outwardly through one of the access openings. Normally this removal from the tank can be done manually, but if necessary, a small gantry crane can be utilized by passing the boom through one of the access openings.

If a tank is to be constructed in which the cylindrical portion of the tank consists of multiple cylindrical sections such as in FIG. 1, or in which the access openings in the tank end covers are not centered on the tank axis, to permit entry of a spindle 66, the anvil ring assembly can be utilized without the benefit of a spindle from the headstock or tailstock. In such an instance rotation of the anvil ring assembly will occur in response to turning of the related end cover of the tank by the lathe via the respective frusto-conical extender 24.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of stir welding together two cylindrical end portions of large, thin-walled tank sections composed of like metallic material which abut one another at a cylindrical joint, assembling within said tank sections an anvil assembly including a multipart anvil ring having a center axis and an outer cylindrical anvil surface such that the inside wall of said cylindrical end portions engage said anvil surface at said joint, applying a high endwise force to a stir welding tool along a line of force passing through said joint and axis while turning said tool about a rotational axis coinciding with said line of force and while moving said tool and tank sections relative to one another along said cylindrical joint with said tank sections being stationary relative to said anvil ring to thereby stir weld the tank sections together at said joint, maintaining a reactive force against the outside of said edge portions at said joint at a location diametrically opposite to said tool so as to press said edge portions against said anvil surface at said location and oppose said endwise force while said tank sections are being stir welded together, and disassembling said anvil assembly and removing the disassembled parts of said anvil assembly through an access opening at the conclusion of the stir welding.

2. A method according to claim 1 in which said tank sections comprise a cylindrical tank shell and a dome-shaped tank head having said access opening, and in which said anvil assembly has detachable spokes extending between said anvil ring and a detachable hub assembly.

3. A method according to claim 2 in which said anvil ring comprises arc segments interconnected at their ends by detachable shim members providing part of said anvil surface, said spokes, arc segments, and shim members being disassembled within said tank shell and removed by being passed out through said access opening at the conclusion of said stir welding.

4. A method of stir welding together two cylindrical end portions of large, thin-walled tank sections composed of like metallic material which abut one another at a cylindrical joint, introducing an anvil ring having a center axis and an outer cylindrical anvil surface such that the inside wall of said cylindrical end portions engage said anvil surface at said joint, applying a high endwise force to a stir welding tool along a line of force passing through said joint and axis while turning said tool about a rotational axis coinciding with said line of force and while moving said tool and tank sections relative to one another along said cylindrical joint with said tank sections being stationary relative to said anvil ring to thereby stir weld the tank sections together at said joint, said one of said tank sections and said anvil ring being carried by a head stock and the other one of said tank sections being carried in part by a tail stock, said head stock and tail stock being rotated in unison about said center axis to move said tool and tank sections circumferentially relative to one another along said cylindrical joint while the stir welding is being performed, and maintaining a reactive force against the outside of said edge portions at said joint at a location diametrically opposite to said tool so as to press said edge portions against said anvil surface at said location and oppose said endwise force while said tank sections are being stir welded together.

5. A method according to claim 2 in which said cylindrical tank shell is resting on rollers, and said tank head is surrounded by a support cage carried by a head stock which supports an axle unit detachably connected to said hub assembly.

6. A method according to claim 1 in which said reactive force is applied by a pair of coplanar rollers each engaging said cylindrical edge portions at said cylindrical joint and having rotational axes parallel to said center axis.

7. A method according to claim 6 in which said rollers are carried by a swing member which is swing-mounted on a ground supported frame to swing toward said joint, and which is loaded by an extensible pressure unit extending between the swing member and said frame to force said rollers against said cylindrical edge portions while said tank sections are being welded together.

8. A method according to claim 1 in which said anvil ring comprises arc segments and spokes which are adjustable in length to press said arc segments against said cylindrical end portions in preparation for the stir welding.

9. A method according to claim 2 in which said access opening is at the center of said tank head and said hub assembly is supported by an axle unit passing through said access opening when said anvil assembly is assembled, and in which said hub assembly is detached from said axle unit while said hub assembly is disassembled.

* * * * *